Dec. 17, 1929.  A. W. F. MANZEL  1,740,429
SHOCK ABSORBER
Filed Dec. 16, 1927  2 Sheets-Sheet 2
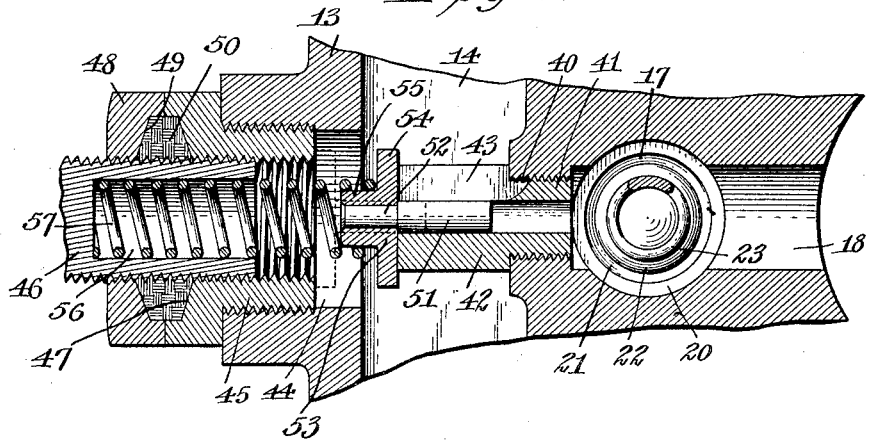
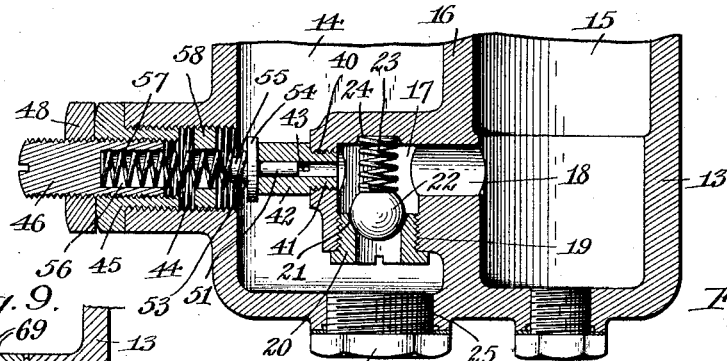
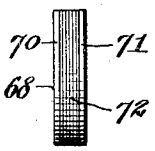
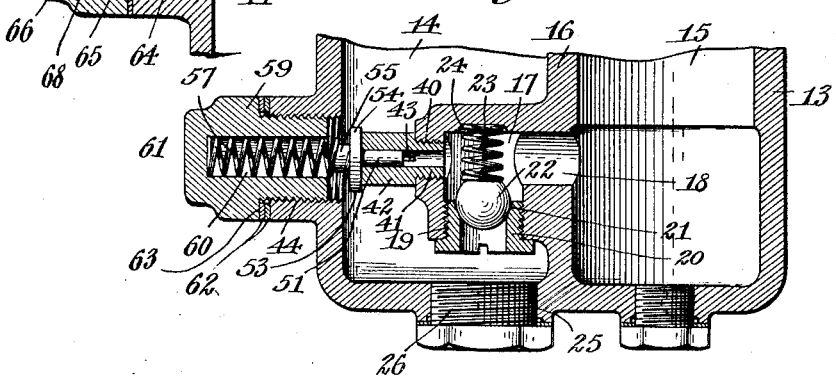
Adolph W. F. Manzel, Inventor.
By Emil Hubart
Attorney.
Witness:
J. Oberst.

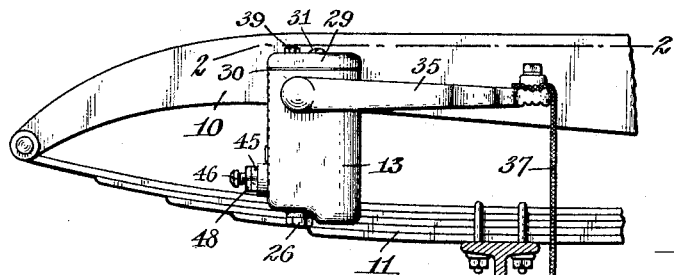
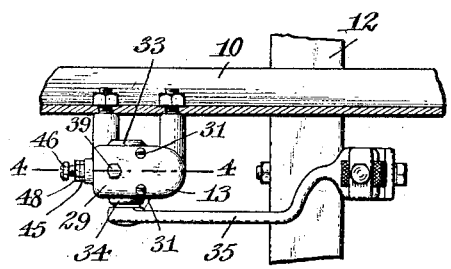
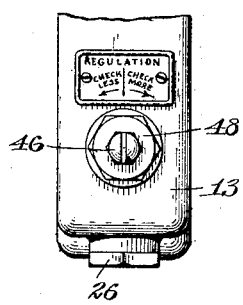
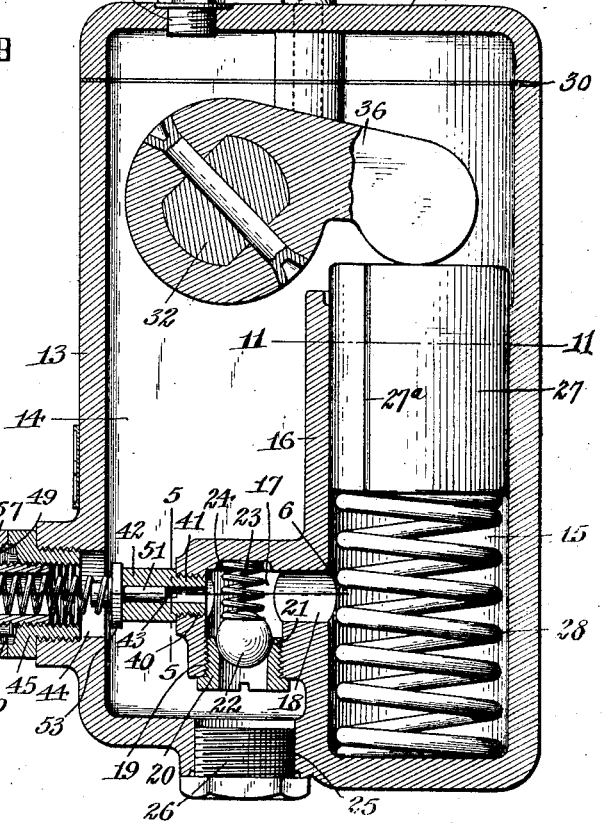

Patented Dec. 17, 1929

1,740,429

UNITED STATES PATENT OFFICE

ADOLPH W. F. MANZEL, OF BUFFALO, NEW YORK, ASSIGNOR TO MANZEL BROS. CO., OF BUFFALO, NEW YORK, A CORPORATION OF NEW YORK

SHOCK ABSORBER

Application filed December 16, 1927. Serial No. 240,469.

My invention relates to shock absorbers for cushioning the movement of two relatively movable members, and more particularly to that type for use in automobiles or other vehicles, to check the rebound of the vehicle body when the vehicle passes into a rut or over a projection in the road.

The primary object of my invention is the production of a simple and inexpensive, yet highly effective shock absorber of the type in which oil or other suitable fluid is utilized in conjunction with suitable control means governing the flow or passage of the oil or other fluid under the principle involved in what is generally termed hydraulic shock absorbers.

Another object of my invention is to provide a shock absorber in which provision is made in an extremely simple manner, and with the use of exceedingly few parts, for more effectively resisting the shocks to which an automobile is subjected when passing over rough roads; and to so control the flow of the resisting fluid within the shock absorber, that the vehicle body, when suddenly depressed in passing into a rut or over a projection in the road, will assume its normally sustained position by an upward or recovering movement which will be gradual and smooth and without marked resistance at any particular point in its recovering movement.

Other objects are to simplify the control means within the shock absorber, whereby the resisting fluid is controlled in its passage from one chamber into another; and to provide simple and effective regulating means whereby the normal resisting force may be varied, depending on the weight carried; thus making it possible to use the shock absorber, without change in construction or size, for automobiles of both light and heavy construction, within reasonable limits.

A further object of my invention is to simplify the control mechanism whereby the passage of oil from one part within the shock absorber to another, is more effectively controlled than has heretofore been possible.

A still further object of my invention is to provide means to prevent free play or ineffective action of the parts upon initial movement of the piston under compressing action.

With these and other objects in view, the invention consists in the novel features of construction, and in the arrangement and combination of parts to be hereinafter described and more particularly pointed out in the subjoined claims.

In the drawings:—

Fig. 1 is a side elevation of my improved shock absorber as applied to an automobile; the rear end of the chassis of the automobile, one of its springs, and one of its axles being shown in connection therewith.

Fig. 2 is a section taken on line 2—2, Fig. 1.

Fig. 3 is an edge view of the lower part of the shock absorber looking toward the right in Fig. 1.

Fig. 4 is an enlarged section taken on line 4—4, Fig. 2.

Fig. 5 is a transverse section taken on line 5—5, Fig. 4.

Fig. 6 is an enlarged horizontal section taken on line 6—6, Fig. 4.

Fig. 7 is a vertical section through the inner end of a shock absorber, showing a modified form of control device for controlling the flow of fluid from one part of the shock absorber casing to another.

Fig. 8 is a similar section, showing a further modified form of the invention.

Fig. 9 is a fragmentary sectional view showing a still further modified form of my invention.

Fig. 10 is an edge view of a packing disk used in said last-mentioned modified form.

Fig. 11 is a transverse section taken on line 11—11, Fig. 4.

In Figs. 1 and 2 I have illustrated parts of an automobile to which one of my improved shock absorbers is shown applied, and as illustrated, these parts are at the front of the automobile. It is, however, to be understood that a shock absorber is provided at each side of the automobile or other vehicle, and that a pair of shock absorbers may be used at the front or at the rear, or both at the front and the rear of the automobile.

The reference numeral 10 designates the frame or chassis of an automobile, and 11 one of the leaf springs fastened at opposite ends to said frame or chassis in the usual manner. This leaf spring is secured between its ends to an axle 12, which is shown in cross section in Fig. 1, and in top plan view in Fig. 2.

When passing over a rut or obstruction in the road, the leaf springs become flexed and opposite ends thereof are forced more closely to the road surface under the spring pressure, with the result that the body of the automobile, connected to the ends of the spring by means of the chassis members, is drawn downwardly. The tendency of the springs to recover after passing over the rough portion or portions of a road, will cause a decided upthrow of the body of the automobile, particularly when traveling at a high rate of speed, and it is this upthrow of the body of the automobile which is difficult to control in an effective manner so that riding within an automobile occurs with free and easy action of the vehicle body. The body or chassis and a spring or axle of an automobile may be considered as two relatively movable parts, to one of which the housing or casing of the shock absorber is secured, and to the other an element extending from said housing or casing and adapted to actuate parts therein to cause the resisting fluid to move within the housing or casing under positive control. The housing or casing of the shock absorber is designated by the numeral 13 and it is divided into two chambers 14, 15, by a wall 16. The chamber 15 is cylindrical in cross section and serves as a plunger cylinder. The chamber 14 may be of any desired formation in cross section, and has controlled conduit connection with the cylinder 15, as will appear hereinafter.

The wall 16 has a portion cast thereon which projects into the lower portion of the chamber 14, and this projecting portion is hollowed out to form a valve chamber 17 which has connection with the cylinder 15 through the medium of a passage 18, and also connection with the bottom of the chamber 14 by providing a screw-threaded opening 19 in the bottom wall of said valve chamber and threading thereinto a flanged sleeve 20 beveled at its inner end, as at 21, to provide a valve seat for a valve 22, preferably of spherical shape. Between the valve 27 and the upper end wall of the valve chamber 17 a coil spring 23 is positioned, the lower end of said spring bearing against said valve and the upper end being seated in a depression 24 formed on the inner side of said top wall.

In the bottom of the chamber 14 a screw-threaded opening 25 is provided into which is threaded a plug 26. This opening is alined with the screw-threaded opening 19 in the bottom of the valve chamber 17 and is of sufficient size to permit the sleeve 20, the ball valve 22, and the spring 23 to be entered into the valve chamber from the bottom of the casing.

Within the plunger cylinder 15, a piston or plunger 27 is slidably arranged. In the form shown, this piston or plunger is solid, and in practice is cut from a cylindrical rod to the desired length with the upper end thereof hardened, for a purpose to appear hereinafter. Between the piston or plunger 27 and the bottom wall of the plunger cylinder, a comparatively powerful coil spring 28 is arranged, the upper end thereof bearing against the under side of said piston or plunger, and the lower end against said bottom wall.

The body portion of the housing or casing 13 is open at its upper end and a cover 29 is applied thereto which is rendered fluid-tight by means of a gasket or other suitable packing 30 placed between it and the upper edge of said body portion, and it is secured to said body portion by means of screws 31, or in any other approved manner.

It is to be noted that the wall 16 separating the plunger cylinder from the chamber 14, terminates at its upper end a distance from the upper end of the body portion of said housing or casing, so that the chamber 14 is considerably widened at its upper end and extends over the top of the plunger cylinder 15, and more particularly over the piston or plunger 27. In the upper end of the widened portion of the chamber 14, a rock shaft 32 is transversely disposed, one end of this rock shaft being journaled in one of the side walls of the casing, for example, in a boss 33 (see Fig. 2). This rock shaft extends outwardly from the casing through a boss 34 formed in the other side wall thereof, and preferably integral therewith is a crank or actuating lever 35 disposed at a right angle thereto and substantially parallel with the side walls of the casing, and also with the frame or chassis of the automobile. If desired, this crank or actuating lever may be separately formed and secured to the projecting end of the rock shaft. That portion of the rock shaft positioned between the two side walls of the casing 13 has an actuating arm 36 secured thereto, the outer end of which is extended over the plunger or piston 27 and is in contact therewith. This outer end may be hardened or provided with a hardened portion which bears against the hardened upper end of the piston or plunger so that wear at this point is considerably minimized. Suitable connection is made between the outer end of the crank or actuating lever 35 and the axle 12, and this connection, in the form shown, comprises a strip of webbing or other flexible material 37 secured at one end to the free end of said crank or actuating lever 35 and its other end to the axle 12 in any approved manner.

The top or cover 29 of the casing is provided with a filling opening 38 through which oil or other suitable fluid to be used is to be poured into the casing, this filling opening being closed with a screw plug 39.

In the edge wall of the valve chamber 22 a screw-threaded opening 40 is provided into which is screw-threaded the reduced screw-threaded end 41 of a sleeve or guide 42, said sleeve or guide projecting into the chamber 14 and terminating in close proximity to the adjacent edge wall of the casing. This sleeve or guide has a slot or elongated opening 43 formed therein which extends from the outer end thereof inwardly, as best shown in Fig. 6; the inner end of this elongated opening or slot terminating at the reduced screw-threaded portion of the sleeve or guide. In said edge wall of the casing, an opening 44 is formed, the axis of which is coincident with that of the sleeve or guide 42, and the outer portion of this opening is screw-threaded to receive a gland 45 which is internally screw-threaded, and has threaded thereinto an adjusting screw 46 provided with a polygonal head to permit the application thereto of a wrench for adjusting the same. This head is also provided with a kerf in its head so that it may be adjusted with a screw driver or other flat tool or object. The gland 45 is recessed at its outer end, as at 47, and threaded onto said adjusting screw is a lock nut 48 which is also recessed on its inner side, as at 49; the two recessed portions 47 and 49 forming an annular space in which packing 50 is placed, thus rendering the device fluid-tight at this point.

Within the bore of the sleeve is slidably arranged a cylindrical control stem or valve 51, which is reduced at its outer end, as at 52, to form an outwardly-facing shoulder on said valve. On this reduced outer end a stop collar 53 is mounted, it comprising a disk portion 54 which is adapted to lie against the end of the sleeve, and a boss 55 extending outward axially from said disk. The extremity of the reduced portion of said control stem or valve is upset within a depression in the end of said boss, as clearly shown in Fig. 6, thus serving to hold the collar 53 securely to the stem or valve 51.

The adjusting screw 46 is bored out along its inner portion, as at 56, and a coil spring 57 has its outer portion disposed within the bore of said adjusting screw and its inner portion extending inwardly therefrom in contact with the outer face of the disk portion of the collar 53, the inner end of said spring surrounding the boss 55 of said collar and the outer end thereof bearing against the inner end wall of the bore formed in said adjusting screw. By boring out the adjusting screw, a comparatively long and sensitive spring may be used without forming a very long projecting portion on the casing of the shock absorber, and the tension of this spring can be easily adjusted by loosening the lock nut 48 and rotating the adjusting screw 46 either to the right or left. The rotation of the adjusting screw to the right, will result in increasing the tension of the spring, as indicated in Fig. 3, while rotation to the left will diminish the tension of the spring.

It is to be noted that the inner end of the control stem or valve 51 terminates short of the inner end of the elongated opening or slot 43 formed in the sleeve or guide 42, which sleeve or guide may be termed the valve sleeve, and that the collar 53 bears against the outer end of the sleeve to limit the inward movement of said valve and govern the degree to which the elongated opening or slot 43 is left open.

When using the shock absorber, it is supplied with oil or some other fluid, the oil preferably reaching to the top of the dividing wall 16. It, however, will be quite apparent that the device will operate successfully with the level of the oil in the plane of the under side of the piston 27, or at any level thereabove.

When the automobile travels over uneven roads, passes over ruts, or strikes obstructions, the chassis and body of the automobile will lower, due to its being supported by the springs 11, which become flexed, and cause the casing 13 of the device to move downwardly with the body of the automobile. Under this action the crank or actuating lever 35 assumes an inclined position, which results in the actuating arm 36 more closely approaching the cover 29 of the casing. This allows the spring 28 in the cylinder 15 to force the plunger or piston 27 upwardly within said cylinder, thereby creating suction within the lower portion of the cylinder and the valve chamber and causing the spherical or ball valve 22 to be lifted from the valve seat 21 against the action of the spring 23. This results in oil being drawn into the plunger cylinder 15 from the bottom of the chamber 14, the oil moving through the sleeve 20, valve chamber 17, and conduit connection or passage 18. Under such action the fluid in the chamber 19 is lowered, and filling of the unoccupied portion of the plunger cylinder 15, by reason of the elevation of the piston or plunger 27, takes place.

When the chassis and the body of the vehicle move upwardly on what is generally termed the "recovering" movement or "rebound," the casing 13 will move upwardly with the chassis or body, the free end of the crank or actuating lever 35 being restrained from upward movement due to the fact that it is connected by the webbing 37 with the axle 12. This causes the crank or actuating lever 35 to gradually assume a horizontal position, or a less inclined or angular position, and at times an oppositely-inclined or angular position, depending, in the first instance, on the position of such lever when the parts are normal. However, as shown in the drawings, the crank or actuating lever 35 is in substantially horizontal position when the parts are normal, and consequently after assuming a rearwardly-inclined position when the body lowers and the springs 11 are flexed, recovery of the body to normal position will return said lever to horizontal position, at which times the actuating arm 36 will again assume the position shown in Fig. 4, or a position downwardly beyond that so shown.

This results in the piston or plunger 27 being moved downwardly by said actuating arm against the force of the main spring 28.

During the downward movement of the piston or plunger 27 within its cylinder, oil within said cylinder is forced outwardly therefrom into the valve chamber 17, and as the spherical or ball valve 22 was seated against its valve seat under action of the spring 23 the instant the piston reached the end of its upward movement, the oil forced into said valve chamber by action of the piston or plunger 27 will be compelled to find an outlet from the valve chamber through the exposed inner end portion of the elongated opening or slot 43 formed in the valve sleeve 42, the oil passing into said sleeve and entering the chamber 14 under retarded flow through the exposed portion of said elongated opening or slot.

The elongated opening or slot is caused to be restricted by the spring 57 within the adjusting screw 46, this spring holding the collar 53 on the valve 51 against the end of the valve sleeve. The exposed portion of the opening or slot 43 is the normally effective portion of said opening or slot, and in order to enlarge this effective portion, the pressure against the inner end of the valve 51 must be sufficient to overcome the tension of the spring 57, which tension may be increased or diminished to suit the conditions existing when the shock absorber is applied to any particular automobile.

If, at any time, the pressure created by the action of the piston or plunger 27 against the oil within the piston cylinder and valve chamber exceeds that of the force of the spring 57, the valve 51 will be moved outwardly and cause the effective portion of the opening or slot 43 in the valve sleeve to be enlarged in size in accordance with the increased pressure applied to said valve. It will thus be apparent that the escape of the oil from the piston cylinder into the chamber 14 is restricted and controlled or governed after the pressure reaches a certain degree in exact proportion to the pressure applied; it being understood that the normally effective opening in said valve sleeve will properly take care of all pressures up to that required to bring the valve 51 into action. This assures a slow even recovery of the automobile body on its rebound without checks or stops, as appears common in present day fluid shock absorbers, generally referred to as hydraulic shock absorbers.

By using an elongated opening or slot to serve as the oil passage leading to the oil chamber 14 and providing means for gradually opening said elongated opening or slot under pressure created by the plunger, a gradual movement of the automobile body is assured, the body moving downwardly under shock without any intermittent checks or points of retardation in its movement, as occurs with shock absorbers now in use.

The outward movement of the valve 51 is controlled by the inner end of the gland 45 and it is therefore essential that the disk portion 55 of the collar 53 be of a diameter somewhat greater than the threaded opening in said gland, but smaller than the opening 44 in the casing, so that the marginal portion of this collar will come in contact with the end of said gland at the limit of the outward movement of the valve, as indicated by dotted lines in Fig. 6, which shows the maximum effective enlargement of the opening or slot 43 in the valve sleeve.

As there is a tendency of the oil within shock absorbers of this type creating a frothy or foamy condition at the top of the oil within the plunger cylinder, the initial downward movement of the plunger upon the recovering or rebound stroke thereof is ineffective when this condition becomes aggravated, due to the fact that the froth caused by agitation of the oil, offers no resistance to the downward movement of the plunger, and this plunger is consequently free in its downward movement until it comes in contact with the oil body within the cylinder. This results in the parts between the plunger and the axle of the automobile having free and unrestrained movement and when the automobile body is depressed in passing over a rut or elevation on the road, or through a depression, the body is offered no resistance in its upward movement during the time that the plunger is compelled to pass through the frothy or foamy upper portion of the oil within the cylinder. Therefore, the initial portion of the recovering or rebound movement of the body will be unrestrained and no check offered thereagainst until the plunger comes in contact with the oil body, when a sudden and abrupt check is offered to the upward movement until a portion of this oil body is being forced out through the restricting opening 43. I therefore provide means to prevent the formation of froth at the top of the oil body within the cylinder, or at least to minimize such formation, and if under severe conditions some froth or foam is created at such point, to permit the frothy or foamy oil surface portion to escape from beneath the plunger, and to this end a shallow and comparatively narrow groove 27ª is formed in the plunger 27 from end to end thereof, which allows oil, or any frothy or foamy matter forming at the top of the oil body in the cylinder, to pass upwardly through the groove and escape into the oil chamber 14, thus assuring resistance at every point of the recovery or rebound movement of the automobile body.

The modification shown in Fig. 7 is similar to that of the preferred construction in the preceding figures, with the exception that the outward movement of the collar 53 is limited by an adjustable stop disk 58 arranged within the opening 44 formed in the valve casing. In this construction the opening 44 is somewhat longer than that in the preferred construction, and it is screw-threaded along its entire length, thus permitting the adjusting disk 58 to be moved along a range extending from the inner end of the gland 45 to the inner end of the opening 44 into which the gland is threaded.

In the modification shown in Fig. 8, the adjusting screw is dispensed with and the gland, designated by the numeral 59 in this case, is somewhat modified in construction in that it has a bore 60 extending from its inner end outwardly, and this bore receives the spring 57, the outer end of the gland being, of course, closed, as at 61, to provide an abutting wall for the outer end of said spring, the inner end of the spring bearing against the collar 53 of the valve, as in the preferred construction. The inner end of this gland limits the outward movement of the valve 51 within its valve sleeve, and determines the range of movement of said valve. In this instance, a gasket or gaskets 62 are interposed between the casing, and a shoulder 63 formed on the gland. No adjustment for changing the tension of the spring is provided in this construction, but it is intended that the spring shall have minimum pressure against the collar of the valve when the parts are assembled, and if found that the pressure so provided is insufficient for effective operation of the shock absorber, the gland 59 is removed and one or more washers or similar disk-like elements placed within the bore so as to bear against the closed outer end walls 61 of the gland, in which case the outer end of the spring will bear against these washers or other elements instead of against said wall.

In the modification shown in Fig. 9, the opening 44 formed in the casing 13 is screw-threaded from end to end, and the gland 64 threaded thereinto has its bore 65 screw-threaded from its outer end inwardly for a short distance, as at 66. A screw plug 67 is threaded into the screw-threaded portion of this bore and behind it is arranged a packing washer 68 which may bear directly against the inner end of the plug 67, or have any number of metallic disks, such as 69 associated therewith, either against the inner side of the packing washer 68 or between said washer and the plug; the latter, for example, being illustrated in Fig. 9. This metallic washer comprises two thin metallic members 70, 71, and a member 72 compressible between said thin metalic members. The intermediate member 72, upon being compressed, will cause expansion thereof radially so that it is forced against the wall of the gland 64 behind the plug 67 and renders the bore of said gland oil-tight at this point. The spiral spring 57 bears against the packing washer 68 when used without disks, such as 69, or when used with disks located between the washer and the plug, or the spring may bear against the disks when placed behind the washer. The spring 57 acts against the valve 51 in the same manner as illustrated in the preceding figures, and the tension of this spring is varied according to the absence of the disks 69, or to the number of such disks employed.

Having thus described my invention, what I claim is:—

1. A shock absorber, comprising a casing having a chamber containing oil and a cylinder also containing oil and separated from said chamber by a wall, and a plunger within said cylinder, said chamber and cylinder having conduit connection with each other controlled to admit the free flow of oil from said chamber to said cylinder upon the suction stroke of said plunger and to restrict the flow of oil from said cylinder to said chamber through a passage having a normally effective open area enlargable upon the pressure stroke of said plunger causing a predetermined high pressure within said cylinder and in exact accordance with the increase in pressure.

2. A shock absorber, comprising a casing having a chamber containing oil and a cylinder also containing oil and separated from said chamber by a wall, said wall having a valve chamber projecting into said oil-containing chamber, a plunger within said cylinder, a valve within said valve chamber normally closed and adapted to open upon the suction stroke of said plunger to admit the free passage of oil from said oil-containing chamber to said cylinder, a sleeve projecting from said valve chamber and extending into said oil-containing chamber, said sleeve having conduit connection with said cylinder through said valve chamber and having also an elongated longitudinally-disposed opening in its peripheral wall of even width throughout its effective length, and a valve within said sleeve controlling said opening to gradually open the same according to pressure exerted upon said valve.

3. A shock absorber, comprising a casing having a chamber containing oil and a cylinder also containing oil and separated from said chamber by a wall, a plunger within said cylinder, a valve chamber projecting into said oil-containing chamber from said wall and having conduit connection with said cylinder and having also a valve-controlled passage for the free passage of oil from said oil-containing chamber to said cylinder upon the suction stroke of said plunger, a sleeve extending from the wall of said valve chamber into said oil-containing chamber and having an elongated longitudinally disposed outlet opening in its peripheral wall, a valve fitting into said sleeve and having a collar bearing against the outer end thereof to limit the inward movement of said valve and normally maintain said oil-containing chamber in communication with said valve chamber through a given area of said opening, a coil spring bearing against the collar of said valve to hold said collar against said sleeve, said spring yielding under abnormal pressure applied to said valve and said valve being movable under such pressure in exact accordance with the pressure to open said outlet opening to a corresponding degree, and an adjustable element threaded into said casing to vary the tension of said coil spring.

4. A shock absorber, comprising a casing having a chamber containing oil and a cylinder also containing oil and separated from said chamber by a wall, a plunger within said cylinder, said wall having a hollow portion projecting therefrom near its lower end and provided with a passage leading to said cylinder and a passage leading downwardly to said oil-containing chamber, a spring-pressed valve within said hollow portion controlling the passage downwardly therefrom and adapted to open for the free passage of oil from said chamber to said cylinder upon the suction stroke of said plunger, a sleeve in communication with said hollow portion and extending outwardly therefrom, said sleeve having a slot formed lengthwise in its peripheral wall, a member extending into said sleeve and closing a portion of said slot, said member having a collar at its outer end bearing against the outer end of said sleeve, the inner end of said member terminating a predetermined distance from the inner end of said slot, an opening in said casing alined with said member, a gland threaded into said opening and against each inner end of which the collar of said member is adapted to strike to limit the outward movement thereof, an adjusting screw threaded into said gland and having a bore extending from its inner end outwardly, and a coil spring disposed in the bore of said adjusting screw and extending therefrom with its inner end in contact with the collar of said member, said spring having its outer end in contact with the inner end and wall of said bore.

5. In a shock absorber, an oil control device, comprising a cylindrical sleeve through which oil is passed under pressure and having an elongated longitudinally-disposed slot therethrough of even width along its effective area, a cylindrical valve slidably disposed within said sleeve and normally positioned to leave a predetermined restricting area of said slot opened, and means to normally hold said valve in normal position, said valve being adapted to be moved under pressure to open said slot for the passage of increased quantities of oil therethrough in exact proportion to the pressure exerted on said valve and to permit gradual increase in the flow of oil through said slot.

6. In a shock absorber, an oil control device, comprising a passage having a surrounding wall provided with an elongated slot extending longitudinally along said wall and through which passage oil under pressure is to be passed, a valve movable within said passage and normally leaving a predetermined restricting area of said slot open to permit limited quantities of oil to pass through said slot under all degrees below said predetermined pressure, and means to force oil into said passage under pressure to increase the effective opened area of said slot in accordance with the increase in pressure and to permit gradual increase in the flow of oil through said opening.

7. In a shock absorber, an oil pressure control device, comprising a passage having an elongated opening through the wall thereof through which controlled variable flow of oil is passed, and an element movable in the direction of the length of said opening subjected to the pressure of the oil within said passage and serving to open said opening to a greater or lesser degree and in exact accordance with the degree of pressure of the oil acting against said element and to permit gradual increase or reduction in the flow of oil through said opening, depending on the direction of movement of said movable element.

8. In a shock absorber, a pressure oil control device, comprising a passage having an elongated opening in the wall thereof of comparatively small crosswise dimension and through which oil under variable pressure is to be passed, an element within said passage movable in contact with the wall thereof to close the major portion of said opening and held to normally leave a predetermined restricting area of said opening uncovered thereby to permit limited quantities of oil to pass through said opening under all degrees below a predetermined pressure, means to hold said element in normal position and yieldable to permit movement of said element along said opening as the pressure against said element increases beyond said predetermined pressure, said element further uncovering said opening to increasing extent in proportion to the pressure applied to said element and to permit gradual increase in the flow of oil through said opening.

9. A shock absorber, comprising a casing having a chamber containing oil and a cylinder also containing oil and separated from said chamber by a wall, a plunger within said cylinder, said wall having a passage leading from said chamber to said cylinder for the free flow of oil from said chamber to said cylinder upon the suction stroke of said plunger and a passage leading from said cylinder and having an elongated opening of even width throughout leading to said chamber, said opening being normally restricted to a given size and capable of feeding oil from said cylinder to said chamber under pressure exerted by said plunger, and means to regulate the flow of oil through said passage by gradual enlargement of said opening so as to provide gradual resistance relief without points of resistance.

10. A shock absorber, comprising a casing having a chamber containing oil and a cylinder also containing oil and separated from said chamber by a wall, a plunger within said cylinder, means to allow the free flow of oil from said chamber to said cylinder upon movement of said plunger in one direction, and means to control the flow of oil from said cylinder to said chamber, including a sleeve projecting from said wall and in communication with said cylinder, said sleeve extending into said chamber and having an elongated longitudinally-disposed opening in its wall, and a valve located within said sleeve to control the passage of oil through said elongated opening, said valve being spring-retained within said sleeve and being movable outwardly under pressure exerted by said plunger when moving in an opposite direction, the outward movement of said valve causing a gradual opening of said elongated longitudinally-disposed opening to permit a gradual increase in the flow of oil therethrough in exact proportion to the pressure exerted against said valve by said plunger.

11. A shock absorber, comprising a casing having a chamber containing oil and a cylinder also containing oil and separated from said chamber by a wall, a plunger within said cylinder, said wall having two passages between said chamber and said cylinder controlled to admit the free flow of oil from said chamber to said cylinder upon the suction stroke of said plunger and to assure a restricted flow of the oil from said cylinder to said chamber upon the pressure stroke of said plunger, and means normally restricting the passage controlling the flow of oil from said cylinder to said chamber to a given size operable only when the pressure exerted by said plunger reaches a predetermined point to provide a gradual enlargement of said passage under increasing pressure and to cause a gradual increase in the flow of oil therethrough in exact proportion to the pressure exerted against said restricting means.

12. A shock absorber, comprising a casing having a chamber containing oil and a cylinder also containing oil and separated from said chamber by a wall, a plunger within said cylinder, said wall having two passages between said chamber and said cylinder, one passage being controlled to admit the free flow of oil from said chamber to said cylinder upon the suction stroke of said plunger and the other having a normally restricted passage for the flow of oil from said cylinder to said chamber upon the pressure stroke of said plunger, said normally-restricted passage being increased in size under pressure of said plunger above a predetermined point in exact accordance with the increase in pressure to permit a gradual increase in the flow of oil therethrough, also in exact proportion to the pressure applied.

13. A shock absorber, comprising a casing having a chamber containing oil and a cylinder also containing oil and separated from said chamber by a wall, a plunger within said cylinder, said wall having two passages therein, one to admit the free flow of oil from said chamber to said cylinder upon the suction stroke of said plunger and the other normally restricted to a given size and controlling the flow of oil from said cylinder to said chamber, and spring-pressed means determining the given size of said last-mentioned passage and movable under pressure of said plunger beyond a given point to enlarge said passage in exact accordance with the increase in pressure and to assure a gradual increase in the flow of oil through said passage, also in exact proportion to the pressure exerted against said spring-pressed means.

14. A shock absorber, comprising a casing having a chamber containing oil and a cylinder also containing oil and separated from said chamber by a wall, a plunger within said cylinder, said wall having a passage between said chamber and said cylinder controlled to admit the free flow of oil from said chamber to said cylinder and a passage for the restricted flow of oil from said cylinder to said chamber upon the pressure stroke of said plunger, said last-mentioned passage having a normally effective outlet into said chamber of a given area, and a movable element within said passage adapted to increase the area of said outlet when the pressure of the oil against said element reaches a predetermined high point, the increase of area of said passage being in exact accordance with the increase in pressure and the increase in flow of oil through said passage being also in exact accordance with the increasing pressure.

15. A shock absorber, comprising a casing having a chamber containing oil and a cylinder also containing oil and separated from said chamber by a wall, a plunger within said cylinder, said wall having a passage between said chamber and said cylinder controlled to admit the free flow of oil from said chamber to said cylinder and a passage for the restricted flow of oil from said cylinder to said chamber upon the pressure stroke of said plunger, said last-mentioned passage having an elongated outlet into said chamber of an even width throughout its length, a movable element within said passage normally arranged to open a predetermined length of said elongated outlet and adapted to gradually enlarge said outlet after the pressure of the oil against said element reaches a predetermined high point so as to assure a gradual increase in the flow of oil through said outlet in exact proportion to the increase in the pressure applied to said movable element, yielding means acting against said movable element to cause it to recover its normal position when the pressure thereagainst is lowered to or below said predetermined high point, and means to increase or diminish the pressure exerted by said yielding means against said movable element.

16. A shock absorber, comprising a casing having a chamber containing oil and a cylinder also containing oil and separated from said chamber by a wall, a plunger within said cylinder, said wall having two passages between said chamber and said cylinder, one of said passages including a sleeve projecting into said oil-containing chamber and having a slot of even width extending lengthwise along its wall, an opening in said casing alined with said sleeve, a stop device arranged within said opening, a valve normally positioned within said sleeve and terminating at its inner end a distance from the inner end of said slot to provide a restricted opening through said sleeve at the inner end of said slot, and yielding means exerting pressure against said valve to maintain the same in normal position, said yielding means permitting said valve to move outwardly so as to uncover a greater portion of said slot under and in exact accordance with the increased pressure of the oil within said sleeve and to permit a gradual increase in the flow of oil from said cylinder to said chamber in exact proportion to the pressure of the oil within said sleeve.

17. In a shock absorber, an oil control device comprising a sleeve forming part of a passage and having an elongated slot extending longitudinally along its wall, a cylindrical valve provided with an abutment bearing against the outer end of said sleeve to normally leave uncovered a predetermined restricting area of said slot, said valve being adapted to be moved under pressure to open said elongated slot for the passage of oil therethrough in exact proportion to the pressure on said valve, a stop device adapted to be engaged by said abutment to limit the outward movement of said valve and the maximum degree of opening of said slot, a spring normally holding said abutment against the end of said sleeve, and means to regulate the tension of said spring.

In testimony whereof, I affix my signature.

ADOLPH W. F. MANZEL.